United States Patent
Creedon et al.

(10) Patent No.: US 10,177,618 B2
(45) Date of Patent: Jan. 8, 2019

(54) ROTOR ASSEMBLY AND METHOD OF MANUFACTURING

(71) Applicant: GENERAL ATOMICS, San Diego, CA (US)

(72) Inventors: William P. Creedon, Escondido, CA (US); George T. Santamaria, Encinitas, CA (US); John Charles Hirschy Wick, Encinitas, CA (US)

(73) Assignee: General Atomics, San Diego, CA (US)

( * ) Notice: Subject to any disclaimer, the term of this patent is extended or adjusted under 35 U.S.C. 154(b) by 210 days.

(21) Appl. No.: 15/070,833

(22) Filed: Mar. 15, 2016

(65) Prior Publication Data
US 2017/0271934 A1  Sep. 21, 2017

(51) Int. Cl.
*H02K 1/27* (2006.01)
*H02K 1/28* (2006.01)
*H02K 9/04* (2006.01)
*H02K 15/03* (2006.01)

(52) U.S. Cl.
CPC ............. *H02K 1/28* (2013.01); *H02K 1/274* (2013.01); *H02K 1/278* (2013.01); *H02K 9/04* (2013.01); *H02K 15/03* (2013.01)

(58) Field of Classification Search
CPC ............. H02K 1/28; H02K 1/274; H02K 9/04; H02K 15/03
USPC ........................................ 310/156.12, 156.22
IPC .............................. H02K 1/27,1/28, 9/04, 15/03
See application file for complete search history.

(56) References Cited

U.S. PATENT DOCUMENTS

| 4,391,594 | A | | 7/1983 | Hannibal |
| 4,510,679 | A | | 4/1985 | Aleem |
| 4,746,827 | A | * | 5/1988 | Ochiai .................. H02K 1/278 310/156.22 |
| 5,551,918 | A | | 9/1996 | Jones |

(Continued)

FOREIGN PATENT DOCUMENTS

| JP | 04368440 | 12/1992 |
| JP | 2011188612 | 9/2011 |
| WO | 2014055221 | 4/2014 |

OTHER PUBLICATIONS

KTR Couplings Limited, "BoWex", http://www.ktrcouplings.co.uk/products/brands/bowex, Jun. 2, 2015.

(Continued)

*Primary Examiner* — John K Kim
(74) *Attorney, Agent, or Firm* — Fitch, Even, Tabin & Flannery LLP (57) ABSTRACT

Some embodiments provided rotor assemblies, comprising: a rotor core barrel comprising a wall extending, and at least two compression bridges each formed in the wall proximate one of the lateral ends and separated by a distance; an array of a plurality of magnets positioned on and spaced along the wall between the compression bridges and about a circumference of the rotor core barrel; and one or more pre-stress wraps wrapped over the plurality of magnets and about the rotor core barrel along at least a portion of a length of the rotor core barrel between the compression bridges, wherein the compression bridges enable radial compression deflection, induced by radial compression of the rotor core barrel by the one or more pre-stress wraps, of the wall of the rotor core barrel at the compression bridges relative to the wall of the rotor core barrel proximate the lateral ends.

15 Claims, 6 Drawing Sheets

(56) References Cited

U.S. PATENT DOCUMENTS

| | | | |
|---|---|---|---|
| 5,557,153 A | | 9/1996 | Zimmermann |
| 5,744,887 A | * | 4/1998 | Itoh ........................ H02K 1/278 |
| | | | 310/156.28 |
| 5,801,470 A | * | 9/1998 | Johnson ............... H02K 1/2733 |
| | | | 310/156.27 |
| 6,072,252 A | | 6/2000 | VanDine |
| 7,329,086 B2 | | 2/2008 | Wiebe |
| 7,365,465 B2 | * | 4/2008 | Ludwig .................. H02K 1/278 |
| | | | 310/156.12 |
| 7,579,725 B2 | | 8/2009 | Zhou |
| 8,362,661 B2 | | 1/2013 | DeBlock |
| 8,450,897 B2 | * | 5/2013 | Yoneyama ........... H02K 1/2733 |
| | | | 310/156.12 |
| 2003/0193255 A1 | | 10/2003 | Ludwig |
| 2005/0235481 A1 | * | 10/2005 | Ku ........................ H02K 1/278 |
| | | | 29/596 |
| 2010/0019589 A1 | | 1/2010 | Saban |
| 2012/0283029 A1 | | 11/2012 | Lawrie |
| 2015/0171675 A1 | * | 6/2015 | Carrasco ................ H02K 1/274 |
| | | | 310/156.12 |
| 2017/0271934 A1 | * | 9/2017 | Creedon ................ H02K 1/274 |

OTHER PUBLICATIONS

International Search Report and Written Opinion of the International Searching Authority for PCT Application No. PCT/US2016/053706 dated Dec. 29, 2016.

\* cited by examiner

ROTOR ASSEMBLY AND METHOD OF MANUFACTURING

BACKGROUND

1. Field of the Invention

The present invention relates generally to rotors.

2. Discussion of the Related Art

Many different types of machines incorporate magnetic rotors. The use of magnetic rotors extends to numerous different applications. Rotor stresses resulting from centrifugal force can, however, limit the speed and power density of motors, generators and other machinery incorporating rotors.

SUMMARY OF THE INVENTION

Several embodiments of the invention advantageously address the needs above as well as other needs by providing rotor assemblies. In some embodiments, a rotor assembly comprises: a rotor core barrel comprising a wall extending between lateral ends, and at least two compression bridges each formed in the wall proximate one of the lateral ends and separated by a distance; an array of a plurality of magnets positioned on and spaced along the wall between the compression bridges and about a circumference of the rotor core barrel; and one or more pre-stress wraps wrapped over the plurality of magnets and about the rotor core barrel along at least a portion of a length of the rotor core barrel between the compression bridges, wherein the compression bridges enable radial compression deflection, induced by radial compression of the rotor core barrel by the one or more pre-stress wraps, of the wall of the rotor core barrel at the compression bridges relative to the wall of the rotor core barrel proximate the lateral ends.

Further some embodiments provide methods of constructing a rotor assembly, comprising: cooperating a rotor core barrel at each of two lateral ends with one of two stub shafts each cooperated with and secured with the rotor core barrel at the lateral ends, wherein the rotor core barrel comprises a wall extending between the lateral ends and at least two compression bridges each formed in the wall proximate one of the lateral ends and separated by a distance; cooperating an array of a plurality of magnets on and spaced along and circumferentially about a wall of a rotor core barrel between two compression bridges located proximate lateral ends of the rotor core barrel; wrapping one or more pre-stress wraps over the plurality of magnets and about the rotor core barrel along at least a portion of a length of the rotor core barrel between the compression bridges, at a pressure inducing a radial compression deflection of the wall of the rotor core barrel at least along the portion of the length of the rotor core barrel; and enabling through the compression bridges radial compression deflection, induced by the one or more pre-stress wraps, of the wall of the rotor core barrel at the compression bridges relative to the wall of the rotor core barrel proximate the lateral ends.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Many industrial electrical generators, motors and other such machinery include one or more rotational rotors that are either mechanically rotated (e.g., through water, steam, etc.) or electromagnetically rotated. Often, the rotor stresses resulting from centrifugal force limit the speed and power density of motors, generators and other machinery. As such, some implementations utilize fiber pre-stressing of the rotor in manufacturing and/or assembling the rotor. The fiber pre-stressing in part includes the wrapping of the magnets that are distributed about the circumference and at least a portion of the length of the rotor with one or more high tension strength fibers, ribbons, bands or the like under relatively high force to induce a radially inward compression force on at least the magnets positioned on the rotor.

Fiber pre-stressing the rotor in manufacture and/or assembly can increase speed and power density capability, but in some instances can introduce problems such as with attachment to a shaft or other support to allow rotation of the rotor, reduced rotor bending stiffness, reduced high speed rotor stability, reduced rotor cooling, other such problems, and often a combination of two or more of such problems. For example, the radial compression can cause a radially outward deflection of the rotor core proximate the lateral ends, which can adversely affect the cooperation of the rotor core with stub shafts at the lateral ends. Some embodiments, however, allow the rotor to be fiber pre-stressed while substantially lowering the impact of those issues, facilitating higher speed and power density rotor designs. In part, some embodiments reduce the deflection at the lateral ends of the rotor core allowing for an improved cooperation with stub shafts or other such terminal ends that support the rotation of the rotor.

Figure 1:
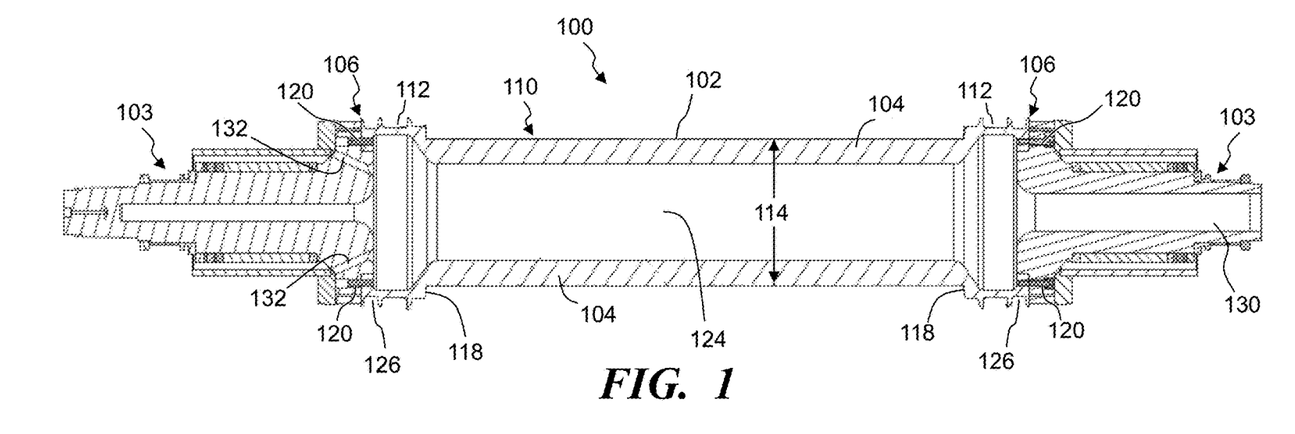
FIG. 1 illustrates a simplified cross-sectional view of an exemplary rotor assembly having a rotor core barrel cooperated with stub shafts, in accordance with some embodiments.

FIG. 1 illustrates a simplified cross-sectional view of an exemplary rotor assembly 100 having a rotor core barrel 102 cooperated with stub shafts 103, in accordance with some embodiments. The rotor core barrel 102 includes a wall 104 extending between lateral ends 106, with the stub shafts secured with the rotor core barrel at the lateral ends. The rotor core barrel further includes magnet receiving area 110 extending along a portion of a length of the rotor core barrel, and typically along a majority of the length of the rotor core barrel. The rotor core barrel further includes one or more compression bridges 112 each formed in the wall proximate one of the lateral ends and separated by a distance, which is typically at least the length of the magnet receiving area.

Figure 2:
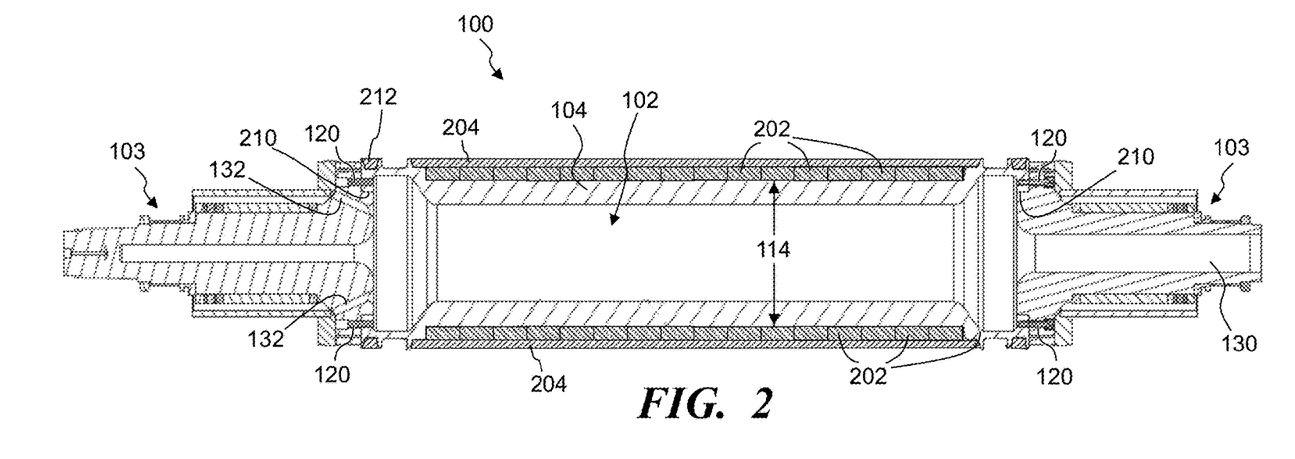
FIG. 2 illustrates a simplified cross-sectional view of the rotor core barrel cooperated with the stub shafts and further illustrating a plurality of magnets positioned on and spaced along the rotor core barrel, in accordance with some embodiments.

FIG. 2 illustrates a simplified cross-sectional view of the rotor core barrel 102 cooperated with the stub shafts 103, in accordance with some embodiments. The cross-sectional view further illustrates a plurality of magnets 202 positioned on and spaced along the wall 104 of the magnet receiving area 110, and typically between the compression bridges 112, and about a circumference of the rotor core barrel. In some instances, the magnet receiving area 110 may be formed with a smaller diameter 114 or width than at the lateral ends 106 of the rotor core barrel. The reduced diameter allows magnets to be cooperated with the rotor core barrel while limiting a diameter of the rotor upon final assembly. As introduced above, in some embodiments, the magnets 202 are further wrapped with one or more pre-stress wraps 204 that are wrapped over the plurality of magnets and about the rotor core barrel.

In some implementations, the pre-stress wraps are wrapped about the magnets along at least a portion of a length of the rotor core barrel between the compression bridges 112, and typically about all of the magnets of the array of magnets. Further, the one or more wraps can be a fiber, a ribbon, bands, other such elements or combination of two or more of such elements. For example, in some implementations, the one or more wraps are ultra-high strength fibers repeatedly wrapped around the circumference of the rotor core barrel and the array of magnets positioned on the rotor core barrel multiple times while under high tension force to induce a compression force on the magnets and the rotor core barrel at least along the length of the rotor core barrel where the magnets are positioned. As described above, the one or more wraps 204 are overwrapped at sufficient force to cause an inward radial compressive pre-stress of the wall 104 of the rotor core barrel causing a reduction of the diameter 114 of the rotor core barrel at least along a portion of the length of the rotor core barrel. The wraps, in part help to affix the magnets to rotor core barrel and apply compressive hoop stress at 0 revolutions-per-minute (rpm). The compression force further allows for low hoop stresses at high rotation speeds. Further, the pre-stressed rotor core barrel can improve a fatigue life of the rotor assembly and the generator, motor or other system into which the rotor assembly is cooperated. The fiber pre-stress wraps 204 can be made from substantially any relevant material capable of being wrapped or clamped at the desired force to achieve the desired compression force about the magnets 202 and rotor core barrel, such as but not limited to Kevlar®, carbon fiber, fiberglass, other such material, or combination of two or more of such wraps.

Figure 3:
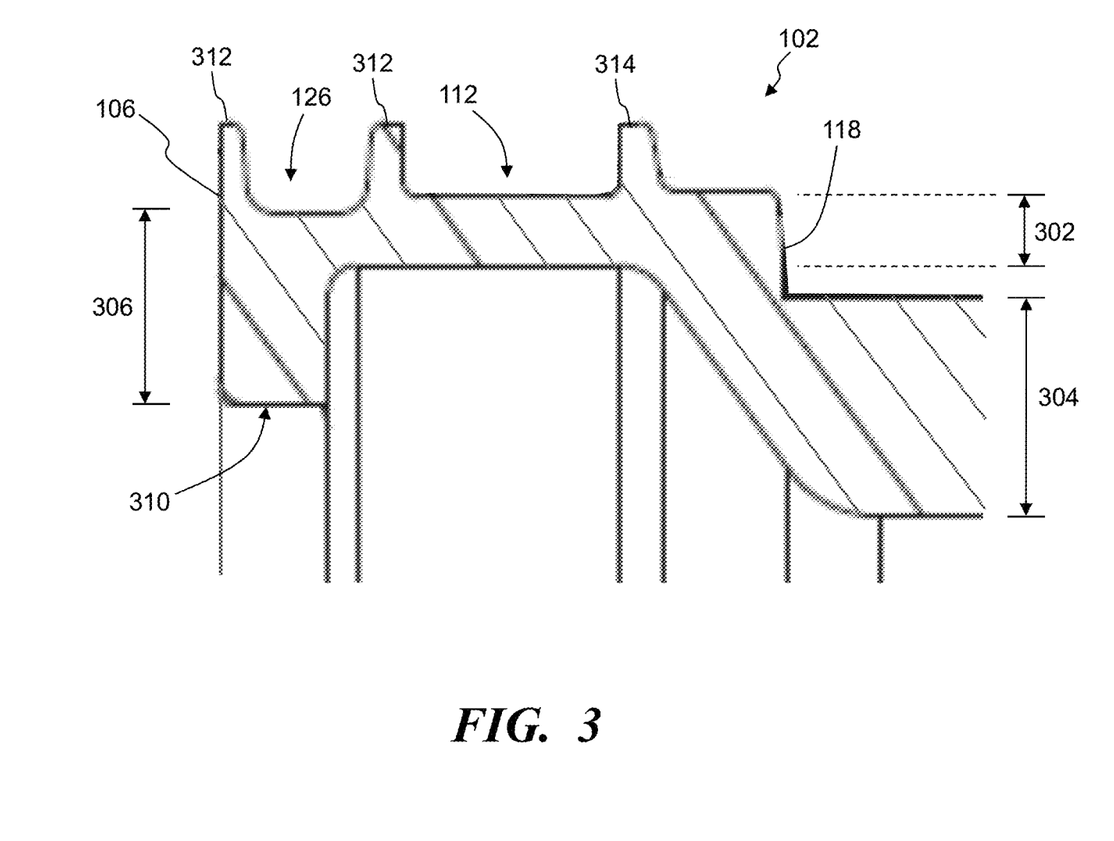
FIG. 3 illustrates a magnified cross-sectional view of a portion of the rotor core barrel of FIG. 1 proximate a lateral end, in accordance with some embodiments.
Figure 4:
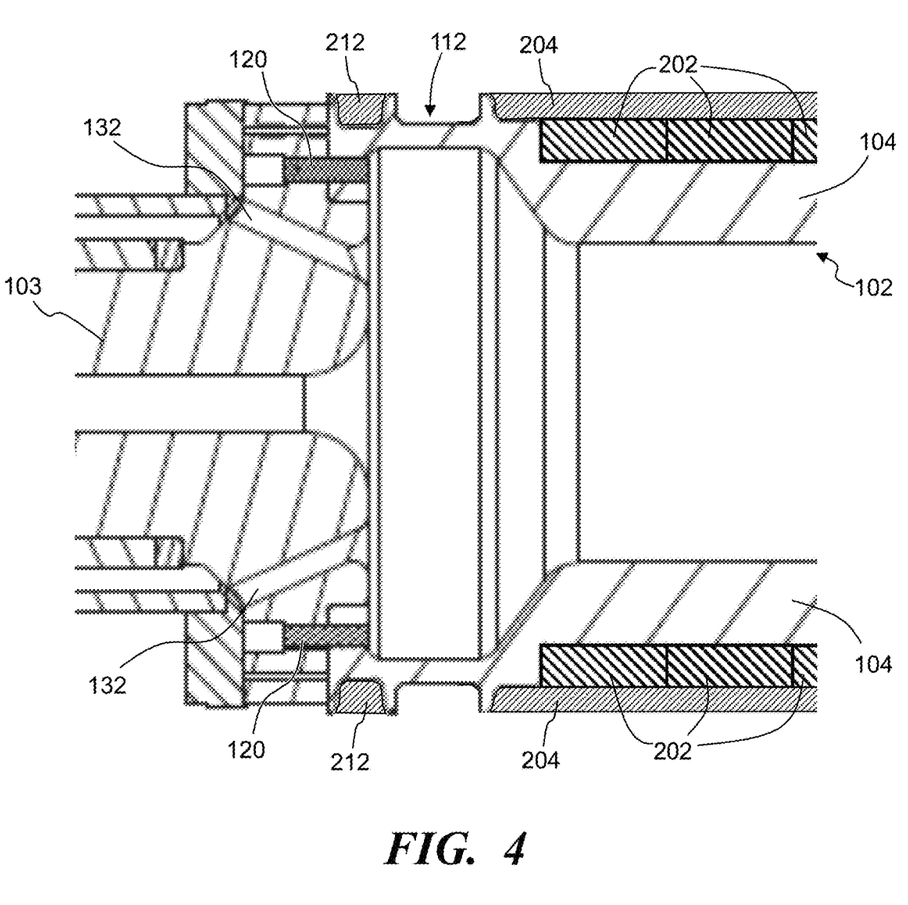
FIG. 4 illustrates a magnified cross-sectional view of a portion of the rotor assembly of FIG. 2, in accordance with some embodiments.

FIG. 3 illustrates a magnified cross-sectional view of a portion of the rotor core barrel 102 proximate a lateral end 106 (e.g., a left end as illustrated in FIG. 1), in accordance with some embodiments. FIG. 4 illustrates a magnified cross-sectional view of a portion of the rotor assembly 100 of FIG. 2, in accordance with some embodiments. Referring to FIGS. 1-4, in some embodiments the rotor core barrel 102 includes two or more compression bridges 112, with at least one compression bridge proximate each lateral end. The compression bridges 112 are radially flexible structural elements formed proximate the longitudinal ends of the pre-stressed section of the rotor core barrel. Further, the compression bridges are configured to flex or elastically yield in response to the radial compression deflection of the portion of the rotor core barrel under the fiber pre-stress, while preventing rotational and axial misalignment between lateral ends and maintaining the bending stiffness of the rotor assembly for the intended implementation and rotational speed.

In some embodiments, the compression bridges 112 are formed in the wall 104 at least in part through a reduced thickness 302 of the wall of at least a portion of the compression bridge relative to a thickness 304 of the adjacent wall along the magnet receiving area 110 and between the compression bridges 112. Further, in some implementations, the thickness 302 of the wall of at least a portion of the compression bridges is less than a thickness 306 of the wall at the lateral ends 106. Some embodiments may include one or more boundary extensions 314 that extend radially away from the extension bridge and the central rotational axis of the rotor core barrel proximate one or both side boundaries of the compression bridge. As such, in at least some implementations the wall 104 comprises at least compression bridges defined by thin regions of the wall and/or two channels circumferentially extending about the rotor core barrel.

This reduced thickness 302 of the compression bridges provides for increased flexibility along the compression bridges. The flexibility of the compression bridges limit, as a function of the radial compression deflection enabled by the compression bridges, radial expansion deflection of the wall proximate the lateral ends away from a central axis of the rotor core barrel that would otherwise be caused by the radial deflection of the rotor core barrel along at least the portion of the length of the rotor core barrel induced by the one or more pre-stress wraps 204. Similarly, during rotation of the rotor assembly, in some embodiment the compression bridges at least in some implementations allow radial expansion of the rotor core barrel at least along the magnet receiving area in response to centrifugal force while maintaining rotational and axial alignment, rotational stiffness and rotor dynamics of the rotor core barrel and rotor assembly.

In some applications, as introduced above, the diameter of the rotor core barrel is reduced along at least a portion of the magnet receiving area 110. As such, the wall adjacent the compression bridges tapers toward a central axis of the rotor core barrel. The tapering of the wall can be at substantially any angle to achieve the change in diameter. In some implementations, the wall thickness 304 of the magnet receiving area is increased to be greater than a thickness of the compression bridges. Further, in some instances, an exterior surface of the wall may include circumferential shoulders 118 at distal ends of the magnet receiving area 110, which in some instances define the boundaries of the magnet receiving area. The thickness 304 of the wall of the magnet receiving area is such that it allows radially inward compression in response to the one or more fiber pre-stress wraps 204 being wrapped about the magnets while still maintaining the structural integrity of the rotor core barrel to withstand the intended rotational speeds and induced centrifugal forces. The thicknesses can depend on the intended implementation of the rotor assembly, including but not limited to one or more of: intended rotational speed, weight of the rotor core barrel, weight of the magnets, type and quantity of fiber wrap, compression force induced by the fiber wrap, material of the rotor core barrel, other such factors, and typically a combination of two or more of such factors. In some implementations, the rotor core barrel is formed of a single material, such as a metal or metallic alloy. For example, in some implementations the rotor core barrel is formed from heat treated steel, or other such material configured to withstand the rotational forces while further enabling the flexing through the compression bridges formed in the wall of the rotor core barrel. Typically, the rotor core barrel is further formed from a ferromagnetic material.

Still referring to FIGS. 1-4, the stub shafts 103 cooperate with the rotor core barrel 102 at the lateral ends 106. In some implementations, multiple bolts 120, pins, or other such fasteners are utilized to affix the stub shafts with the rotor core barrel. In some implementations, the bolts thread through a circumferential flange of each of the stub shafts to threadedly cooperate with the thicker portion of the wall at the lateral ends 106 of the rotor core barrel securing the stub shafts with the rotor core barrel. The stub shafts, in some instances, may further include an extended shoulder 210 that abuts against respective interior edges 310 of the lateral ends 106 of the rotor core barrel and provides an interference fit. The extended shoulders 210 can be configured to aid in providing alignment of the stub shafts with the rotor core barrel, and in some implementations in maintaining positioning of the lateral ends relative to the stub shafts. In some embodiments, the stub shafts at least partially extend into a central cavity 124 of the rotor core barrel.

As introduced above, the flexing of the compression bridges 112 significantly reduces, and in some instances prevents the radial expansion deflection of the rotor core barrel at the lateral ends 106 that may occur as a result of the radial deflection induced by the fiber wrap 204. Further, the compression bridges 112 limit and/or isolate the radially inward deflection in pre-stressed barrel from stub shafts 103. As such, the stub shafts and/or the bolts 120 do not have to constrain such radial deflection and/or the force associated with any radial deflection is significantly reduced. This further maintains the high critical bending speed of the rotor core barrel. The compression bridges further concurrently provide high bending stiffness for shaft stability.

Some embodiments include one or more lateral restraining fiber wraps 212, ribbons, clamps or the like that are further circumferentially wrapped or otherwise clamped about the rotor core barrel 102 proximate the lateral ends. The stub shafts 103 are cooperated with and secured with the rotor core barrel prior to the restraining wraps 212 being applied to the rotor core barrel. The use of the additional composite restraining wrap 212 in affixing the rotor core barrel with the stub shafts aids in restraining the lateral ends of the rotor core barrel at intended high rotational speeds. The restraining wraps can further inhibit the radial outward deflection of the lateral ends of the rotor core barrel that is not inhibited by the compression bridge 112. Still further, the restraining wraps can further help in maintaining a positioning of the ends of the rotor core barrel with the stub shafts (e.g., maintaining the interior edges 310 of the lateral ends 106 against the extended shoulder 210 of the stub shafts). Additionally, the restraining wraps 212 can further help in allowing the bolts 120 to predominantly carry torque loads while limiting or preventing radial loads.

Further, in some implementations, the rotor core barrel 102 includes one or more restraining wrap grooves or channels 126 extending circumferentially about the rotor core barrel proximate each of the lateral ends, and configured to receive and position a restraining wrap wrapped about the rotor core barrel. In some implementations, the restraining wrap grooves are formed between a respective one of the lateral ends and one of the compression bridges. One or more extensions 312 can be included that are separated by a width of the restraining wrap groove 126 and extend radially away from the central rotational axis of the rotor core barrel. The extensions 312 can be formed as part of the wall or can couple with the wall (e.g., through a circular clamp or the like). The depth and/or width of the restraining wrap grooves can depend on the type and size of the wrap used for the restraining wrap 212, amount of wrapping, and other such factors. Similarly, the width of the restraining wrap groove typically depends on the width of the compression bridge and the location of the compression bridge relative to the lateral ends.

The restraining wrap grooves 126 help to locate the restraining wrap and maintain a position of the restraining wraps about the rotor core barrel as they are wrapped about the rotor core barrel. Similar to the fiber wraps 204, the restraining wraps 212 can be made from substantially any relevant material capable of being wrapped or clamped at the desired force to achieve the desired compression force about the rotor core barrel proximate the lateral ends 106 (e.g., Kevlar®, carbon fiber, fiberglass, etc.).

Still referring to FIGS. 1-4, in some implementations, the rotor assembly 100 is further configured to provide internal cooling of the assembly. In many applications, the rotor assembly can heat up during use. Often, the composite pre-stress wrap 204 limits thermal conduction on the outer diameter of the rotor core barrel. As such, it can be advantageous to cool the rotor assembly to achieve desired operating rotational speeds while avoiding damage to the rotor assembly. In some embodiments, internal cooling is achieved through the flow of air or other cooling gas through the rotor core barrel 102.

Figure 5:
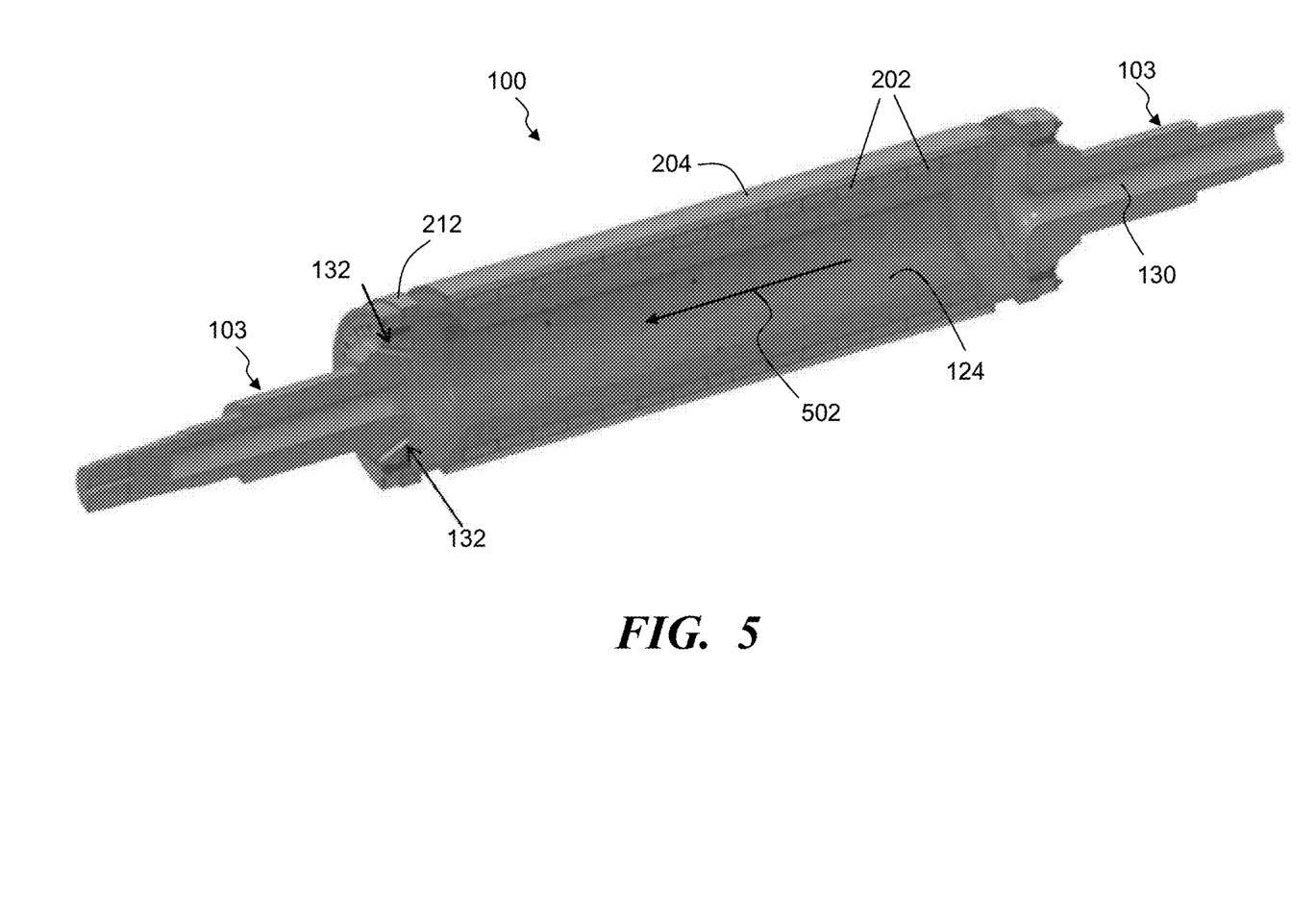
FIG. 5 illustrates a perspective, cross-sectional view of an exemplary rotor assembly, in accordance with some embodiments.
Figure 6:
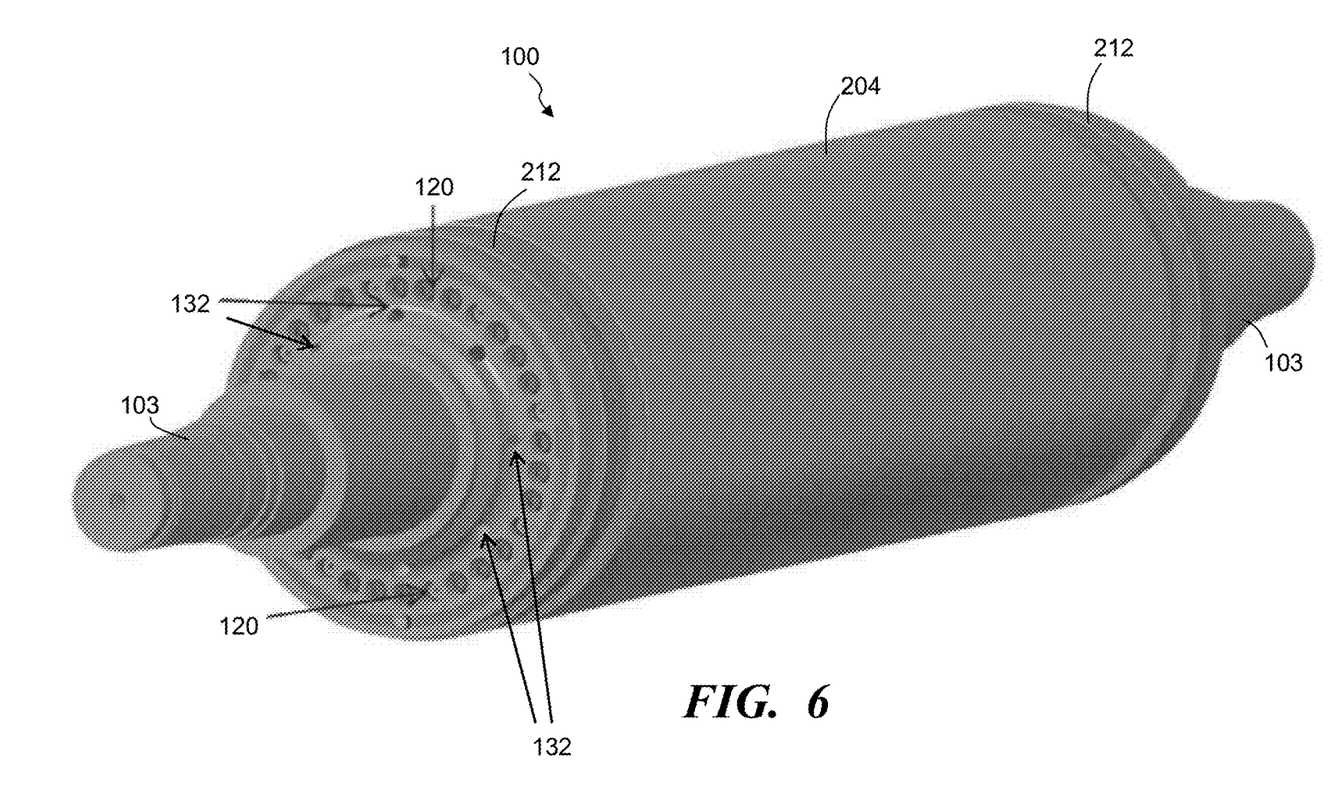
FIG. 6 illustrates a perspective end view of an exemplary rotor assembly, in accordance with some embodiments.

FIG. 5 illustrates a perspective, cross-sectional view of an exemplary rotor assembly 100, in accordance with some embodiments. FIG. 6 illustrates a perspective end view of an exemplary rotor assembly 100, in accordance with some embodiments. Referring to FIGS. 1-6, in some embodiments, the rotor core barrel includes a cavity 124 extending the length of the rotor core barrel and/or the rotor core barrel is hollow. The cavity 124 cooperates with one or more inlet cooling conduit 130, passages, bore, ducts, channels or the like formed in one of the two stub shafts 103. For example, in some implementations, the non-driving end (NDE) stub shaft (illustrated in FIGS. 1-2 and 5-6 as the right side stub shaft) may include an inlet cooling conduit 130 that cooperates with the cavity 124 of the rotor core barrel allowing air to flow through the inlet cooling conduit and into the cavity. Further in this example, the inlet cooling conduit is illustrated as being aligned with the central rotational axis of the rotor core barrel. Other embodiments may include one or more inlet cooling conduits that are positioned offset from the rotational axis.

The other stub shaft 103 (e.g., a driving end (DE) illustrated in FIGS. 1-2 and 5-6 as the left stub shaft) can be configured to include one or more outlet cooling conduits 132, bores, ducts, passages, channels or the like that extend through a thickness of the stub shaft with an interior end of each of the cooling bores interfacing with the cavity 124 of the rotor core barrel. Air or other coolant gas travels through the cavity and exits through the one or more outlet cooling conduits 132. In some implementations, the outlet cooling conduits are configured at an angle relative to central rotational axis of the rotor core barrel. For example, in some instances, the outlet cooling conduits taper such that interior apertures of the outlet cooling conduits are closer to the central axis and exterior apertures of the outlet cooling conduits are further from the central axis. The angle can vary and in some instances may depend on an expected operational rotation speed. Further, in some instances, the outlet cooling conduits may be curved and/or angled relative to an expected direction of travel to further enhance the air flow.

The air flow, indicated in the exemplary embodiment by arrow 502 in FIG. 5, flows from the inlet cooling conduit 130 along the length of the cavity 124 of the rotor core barrel 102 to exit through the outlet cooling conduits 132. The cooperation between the inlet cooling conduit, the configuration of the outlet cooling conduits, and the rotation and centrifugal force of rotation of the rotor assembly induces the air flow into the inlet cooling conduit, along the cavity and exits through the outlet cooling conduits. In implementations, the rotation of the rotor core barrel draws air through the inlet cooling conduit of the second stub shaft, along the cavity and out of the multiple outlet cooling conduits decreasing an internal temperature of at least the rotor core barrel.

Accordingly, the cooling operates in concert with the pre-stress wrap to reduce the heat that may be conducted through the pre-stress wraps and/or the thermal conduction that may be limited by least the pre-stress wraps. Additionally, the rotation of the rotor core barrel in cooperation with the coolant or cooling airflow paths through the cavity of the rotor core barrel and the outlet cooling conduits creates pressure gradients to cause the airflow through the rotor core barrel. As such, the cooling airflow is achieved without the additional complexity of adding a fan or blower to the system.

Figure 7:
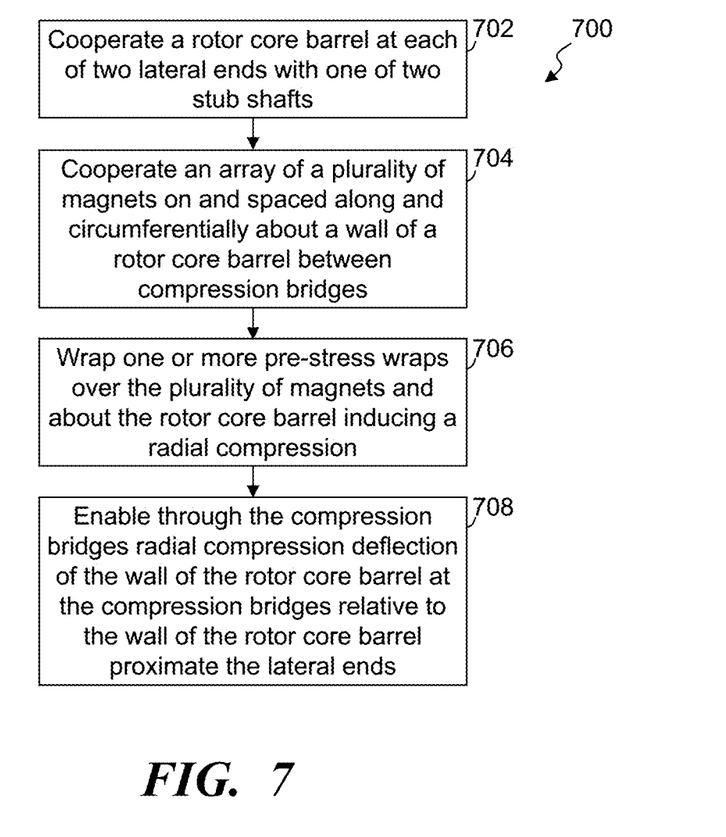
FIG. 7 illustrates a simplified flow diagram of a process of constructing and/or assembling a rotor assembly, in accordance with some embodiments.

FIG. 7 illustrates a simplified flow diagram of a process 700 of constructing and/or assembling a rotor assembly 100, in accordance with some embodiments. In step 702, a rotor core barrel 102 is cooperated at each of two lateral ends 106 with one of two stub shafts 103 with each of the two stub shafts being cooperated with and secured with the rotor core barrel at the lateral ends. The rotor core barrel comprises a wall 104 extending between the lateral ends, and at least two compression bridges 112 each formed in the wall proximate one of the lateral ends and separated by a distance. In some implementations, the rotor core barrel further includes the magnet receiving area 110 positioned between two compression bridges. Additionally, in some instances, rotor core barrel has a step at each end of the magnet receiving area such that a diameter of the rotor core barrel is less along the magnet receiving area than a diameter at the lateral ends. The rotor core barrel is further formed with a first thickness defining at least a portion of the compression bridges, and at least a second thickness adjacent to each compression bridge and between the compression bridges. The second thickness is greater than the first thickness. In some embodiments, at least two channels or grooves are formed in the wall that extend circumferentially about the rotor core barrel defining the at least two compression bridges. The channels, in some implementations, are formed from a recess or depression in the wall that extends about the circumference of the rotor core barrel. In some embodiments, the channel has a rectangular cross-section. Other implementations, however, may utilize one or more channels with different cross-sectional shapes, such as but not limited to semi-circular, semi-oval, triangular, or other such shapes to achieve a desired deflection through the compression bridges. Similarly, the bottom or floor of the compression bridge may include multiple relatively small semi-circular, triangular or other such grooves that extend circumferentially about the rotor core barrel and parallel with the compression bridge.

In step 704, an array of a plurality of magnets is cooperated on and spaced along and circumferentially about the wall of a rotor core barrel between two compression bridges located proximate lateral ends of the rotor core barrel. Again, the magnets are typically positioned along and about the magnet receiving area. In some instances, the magnets are equally distributed about the circumference of the rotor core barrel. The type, number, size, strength of magnetic field, and other such characteristics of one or more of the magnets can vary depending on one or more factors, such as an intended implementation of the rotor assembly.

In step 706, one or more pre-stress wraps are wrapped over the plurality of magnets and about the rotor core barrel along at least a portion of a length of the rotor core barrel between the compression bridges. The pre-stress wraps are wrapped at a pressure that induces a radial compression deflection of the wall of the rotor core barrel at least along the portion of the length of the rotor core barrel.

In step 708, radial compression deflection is enabled through the compression bridges, induced by the one or more pre-stress wraps, of the wall of the rotor core barrel at the compression bridges relative to the wall of the rotor core barrel proximate the lateral ends. Further, some embodiments limit, as a function of the radial compression deflection enabled by the compression bridges, radial expansion deflection of the wall proximate the lateral ends away from a central axis that would otherwise be caused by the radial compression deflection of the rotor core barrel along the at least the portion of the length of the rotor core barrel induced by the one or more pre-stress wraps.

In some embodiments, the rotor core barrel is further configured with at least two restraining wrap grooves 126 that are form in the wall 104. At least one restraining wrap groove each extends circumferentially about the rotor core barrel proximate each of the lateral ends. At least one restraining wrap is wrapped one or more times about the circumference of the rotor core barrel and within each of the restraining wrap grooves, wherein the restraining wrap grooves are configured to receive and position the restraining wrap wrapped about the rotor core barrel proximate each of the lateral ends. The wrapping of the restraining wraps about the wall of the rotor core barrel proximate each of the lateral ends induces a radially compression force and inhibits radial expansion deflection of the wall 104 at the later ends away from a central axis of the rotor core barrel.

As described above, some embodiments are configured to provide a cooling of the rotor assembly. In some implementations, a first stub shaft (e.g., a drive end) is formed with multiple outlet cooling conduits that interface at an interior end with the one or more cavities 124 of the rotor core barrel when the stub shaft is secured with the rotor core barrel. The outlet cooling conduits extend through the stub shaft to provide airflow out of the cavity. A second stub shaft (e.g., the non-drive end) can be configured with one or more inlet cooling conduits that extend through a thickness of the second stub shaft and provide an inflow of air into the cavity. In some implementations, an inlet cooling conduit is formed to align with a central rotational axis of the second stub shaft and extends the length of the second stub shaft.

In some embodiments, a first stub shaft (e.g., a non-drive end stub shaft) can be cooperated with a first lateral end of the rotor core barrel such that an interior end of each of one or more outlet cooling conduits 132 extending through a thickness of the first stub shaft communicates with at least one cavity 124 extending through a length of the rotor core barrel. In some instances, the outlet cooling conduits are formed through a shoulder of the stub shaft that radially extends from a central shaft of the stub shaft. A second stub shaft (e.g., a drive end stub shaft) can be cooperated with a second lateral end of the rotor core barrel such that an inlet cooling conduit formed in the second stub shaft communicates with at least one cavity 124 of the rotor core barrel. The cooperation of the inlet cooling conduit and the outlet cooling conduits with the cavity 124 establishes a coolant flow path through the inlet cooling conduit of the second stub shaft, along the at least one cavity and out of the multiple outlet cooling conduits enabling coolant flow in response to rotation of the rotor core barrel to decrease an internal temperature of at least the rotor core barrel. In some implementations, causing the rotor core barrel and array of magnets to rotate causes air to be drawn through an inlet cooling conduit 130 of a second stub shaft, along the hollow cavity 124 of the rotor core barrel extending along the length of the rotor core barrel, and expelling the air drawn in out of multiple outlet cooling conduits 132 formed in the second stub shaft.

Some embodiments provided rotor assemblies, comprising: a rotor core barrel comprising a wall extending between lateral ends, and at least two compression bridges each formed in the wall proximate one of the lateral ends and separated by a distance; an array of a plurality of magnets positioned on and spaced along the wall between the compression bridges and about a circumference of the rotor core barrel; and one or more pre-stress wraps wrapped over the plurality of magnets and about the rotor core barrel along at least a portion of a length of the rotor core barrel between the compression bridges, wherein the compression bridges enable radial compression deflection, induced by radial compression of the a rotor core barrel by the one or more pre-stress wraps, of the wall of the rotor core barrel at the compression bridges relative to the wall of the rotor core barrel proximate the lateral ends.

Further some embodiments provide methods of constructing rotor assemblies, comprising: cooperating a rotor core barrel at each of two lateral ends with one of two stub shafts each cooperated with and secured with the rotor core barrel at the lateral ends, wherein the rotor core barrel comprises a wall extending between the lateral ends and at least two compression bridges each formed in the wall proximate one of the lateral ends and separated by a distance; cooperating an array of a plurality of magnets on and spaced along and circumferentially about a wall of a rotor core barrel between two compression bridges located proximate lateral ends of the rotor core barrel; wrapping one or more pre-stress wraps over the plurality of magnets and about the rotor core barrel along at least a portion of a length of the rotor core barrel between the compression bridges, at a pressure inducing a radial compression deflection of the wall of the rotor core barrel at least along the portion of the length of the rotor core barrel; and enabling through the compression bridges the radial compression deflection, induced by the one or more pre-stress wraps, of the wall of the rotor core barrel at the compression bridges relative to the wall of the rotor core barrel proximate the lateral ends.

While the invention herein disclosed has been described by means of specific embodiments, examples and applications thereof, numerous modifications and variations could be made thereto by those skilled in the art without departing from the scope of the invention set forth in the claims.

What is claimed is:
1. A rotor assembly, comprising:
 a rotor core barrel comprising a wall extending between lateral ends with at least two compression bridges each formed in the wall proximate one of the lateral ends and separated by a distance;
 an array of a plurality of magnets positioned on and spaced along the wall between the compression bridges and about a circumference of the rotor core barrel; and
 one or more pre-stress wraps wrapped over the plurality of magnets and about the rotor core barrel along at least a portion of a length of the rotor core barrel between the compression bridges, wherein the compression bridges are configured to flex along lengths of the compression bridges when radial compression deflection, induced by radial compression of the rotor core barrel by the one or more pre-stress wraps, of the wall of the rotor core barrel occurs relative to the wall of the rotor core barrel proximate the lateral ends while inhibiting deflection at the lateral ends.

2. The rotor assembly of claim 1, wherein the compression bridges limit, as a function of the radial compression deflection enabled by the compression bridges, radial expansion deflection of the wall proximate the lateral ends away from a central axis that would otherwise be caused by the radial compression of the rotor core barrel along the at least the portion of the length of the rotor core barrel induced by the one or more pre-stress wraps.

3. The rotor assembly of claim 2, wherein the wall comprises a first thickness defining at least a portion of the compression bridges, and at least a second thickness adjacent to each compression bridge and between the compression bridges, wherein the second thickness is greater than the first thickness.

4. The rotor assembly of claim 3, wherein the wall has a third thickness proximate the lateral ends, wherein the third thickness is greater than the first thickness and the third thickness is separated from the second thickness by the compression bridges.

5. The rotor assembly of claim 1, further comprising:
two restraining wraps each wrapped about the wall of the rotor core barrel proximate each of the lateral ends inducing a radial compression force and inhibiting radial expansion deflection of the wall at the lateral ends away from a central axis of the rotor core barrel.

6. The rotor assembly of claim 5, wherein at least one of the at least two compression bridges separates one of the two restraining wraps from a central magnetic receiving area of the rotor core barrel between the at least two compression bridges.

7. The rotor assembly of claim 6, wherein the rotor core barrel further comprises:
restraining wrap grooves extending circumferentially about the rotor core barrel proximate the lateral ends of the rotor core barrel each formed between one of the lateral ends and a corresponding one of the at least two compression bridges.

8. The rotor assembly of claim 7, wherein the rotor core barrel further comprises:
restraining wrap grooves extending circumferentially about the rotor core barrel proximate the lateral ends of the rotor core barrel and are each separated from the magnetic receiving area of the rotor core barrel by a corresponding one of the at least two compression bridges.

9. The rotor assembly of claim 1, wherein the rotor core barrel comprises a magnetic receiving area between the at least two compression bridges wherein a wall thickness at each of the compression bridges is less than a thickness of the wall along the magnetic receiving area of the rotor core barrel.

10. The rotor assembly of claim 1, wherein a thickness of the wall of at least a portion of the compression bridges is less than a thickness of the wall at the lateral ends.

11. The rotor assembly of claim 10, wherein the rotor core barrel further comprises:
restraining wrap grooves extending circumferentially about the rotor core barrel proximate the lateral ends of the rotor core barrel each formed between one of the lateral ends and a corresponding one of the at least two compression bridges; and
two restraining wraps each wrapped about the wall of the rotor core barrel within one of the restraining wrap grooves inducing a radial compression force and inhibiting radial expansion deflection of the wall at the lateral ends away from a central axis of the rotor core barrel.

12. The rotor assembly of claim 1, wherein the rotor core barrel further comprises:
a cavity extending along the length of the rotor core barrel; and
a first stub shaft and a second stub shaft each cooperated with and secured with the rotor core barrel at the lateral ends;
wherein a first stub shaft comprises multiple outlet cooling conduits extending through a thickness of the first stub shaft with an interior end of each of the outlet cooling conduits interfacing with the cavity of the rotor core barrel; and
wherein the second stub shaft comprises an inlet cooling conduit cooperated with the cavity of the rotor core barrel, such that rotation of the rotor core barrel draws air through the inlet cooling conduit of the second stub shaft, along the cavity and out of the multiple outlet cooling conduits decreasing an internal temperature of at least the rotor core barrel.

13. A rotor assembly, comprising:
a rotor core barrel comprising a wall extending between lateral ends with at least two compression bridges each formed in the wall proximate one of the lateral ends and separated by a distance;
an array of a plurality of magnets positioned on and spaced along the wall between the compression bridges and about a circumference of the rotor core barrel; and
one or more pre-stress wraps wrapped over the plurality of magnets and about the rotor core barrel along at least a portion of a length of the rotor core barrel between the compression bridges, wherein the compression bridges enable radial compression deflection, induced by radial compression of the rotor core barrel by the one or more pre-stress wraps, of the wall of the rotor core barrel at the compression bridges relative to the wall of the rotor core barrel proximate the lateral ends;
wherein the compression bridges limit, as a function of the radial compression deflection enabled by the compression bridges, radial expansion deflection of the wall proximate the lateral ends away from a central axis that would otherwise be caused by the radial compression of the rotor core barrel along the at least the portion of the length of the rotor core barrel induced by the one or more pre-stress wraps;
wherein the wall comprises at least two channels circumferentially extending about the rotor core barrel defining the at least two compression bridges.

14. The rotor assembly of claim 13, further comprising:
a restraining wrap groove extending circumferentially about the rotor core barrel proximate each of the lateral ends, and configured to receive and position a restraining wrap wrapped about the rotor core barrel proximate each of the lateral ends.

15. A rotor assembly, comprising:
a rotor core barrel comprising a wall extending between lateral ends with at least two compression bridges each formed in the wall proximate one of the lateral ends and separated by a distance;
an array of a plurality of magnets positioned on and spaced along the wall between the compression bridges and about a circumference of the rotor core barrel; and
one or more pre-stress wraps wrapped over the plurality of magnets and about the rotor core barrel along at least a portion of a length of the rotor core barrel between the compression bridges, wherein the compression bridges enable radial compression deflection, induced by radial compression of the rotor core barrel by the one or more pre-stress wraps, of the wall of the rotor core barrel at the compression bridges relative to the wall of the rotor core barrel proximate the lateral ends;
wherein the rotor core barrel further comprises:
a cavity extending along the length of the rotor core barrel; and
a first stub shaft and a second stub shaft each cooperated with and secured with the rotor core barrel at the lateral ends;

wherein a first stub shaft comprises multiple outlet cooling conduits extending through a thickness of the first stub shaft with an interior end of each of the outlet cooling conduits interfacing with the cavity of the rotor core barrel; and wherein the second stub shaft comprises an inlet cooling conduit cooperated with the cavity of the rotor core barrel, such that rotation of the rotor core barrel draws air through the inlet cooling conduit of the second stub shaft, along the cavity and out of the multiple outlet cooling conduits decreasing an internal temperature of at least the rotor core barrel.

\* \* \* \* \*